United States Patent Office 3,538,317
Patented Nov. 3, 1970

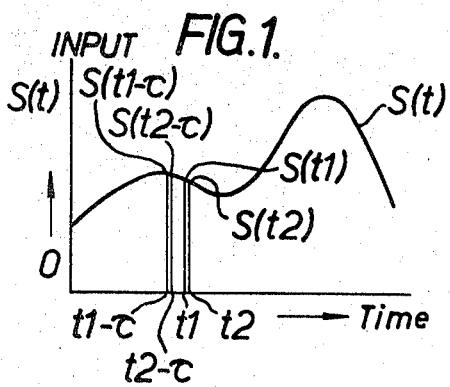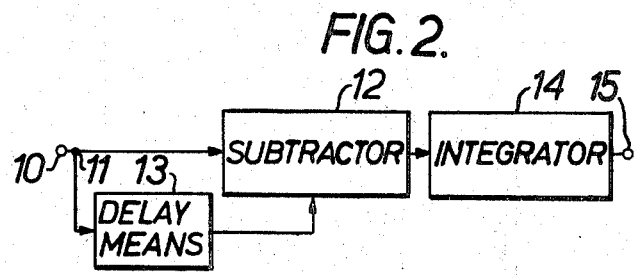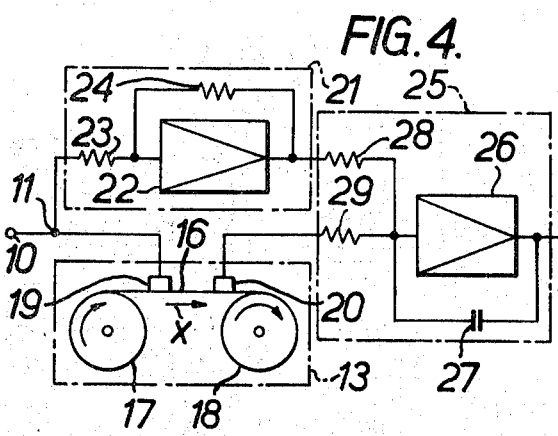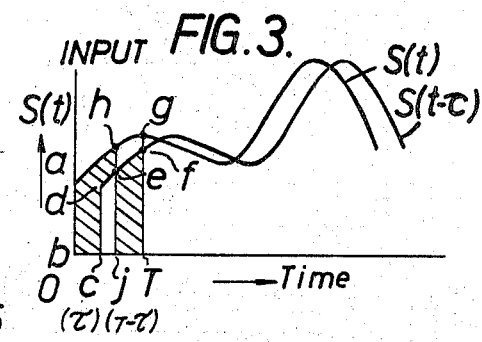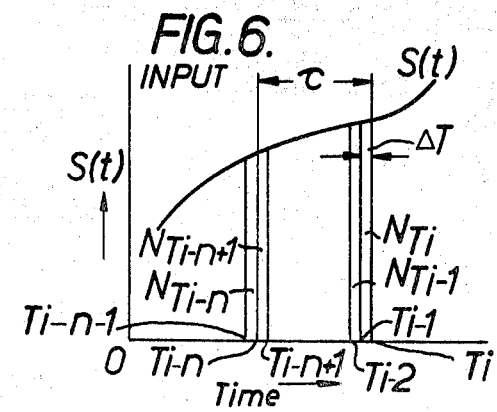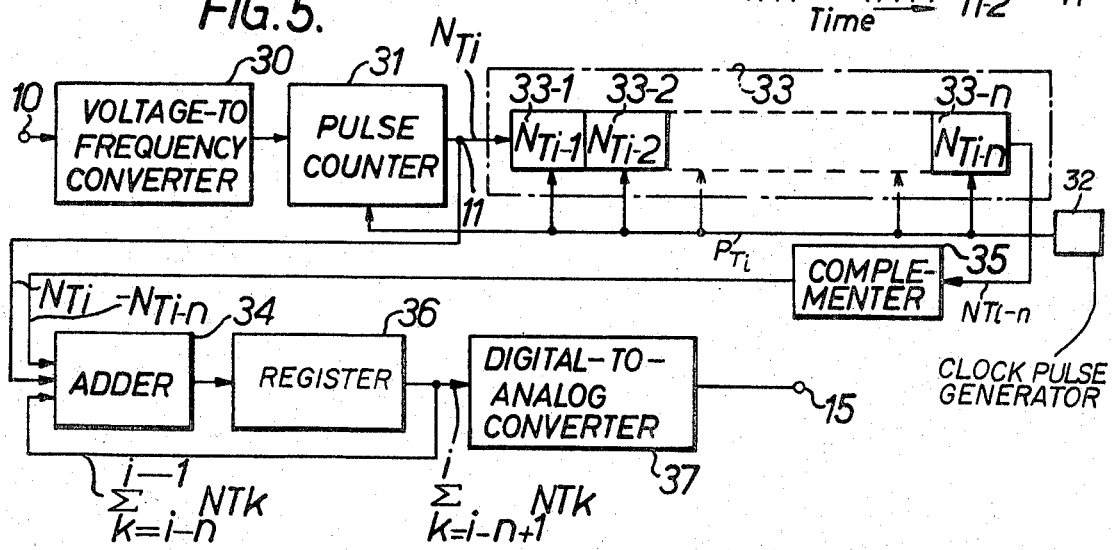

3,538,317
SYSTEM FOR INTEGRATING AN ELECTRICAL SIGNAL TO PROVIDE A CONTINUOUS OUTPUT
Yoshio Fukuda, Osaka, Japan, assignor to Shimadzu Seisakusho Ltd., Nakagyo-ku, Kyoto, Japan, a corporation of Japan
Filed June 7, 1967, Ser. No. 644,193
Claims priority, application Japan, June 9, 1966, 41/37,202
Int. Cl. G06g 7/18; H03k 13/00
U.S. Cl. 235—183        1 Claim

ABSTRACT OF THE DISCLOSURE

A system for integrating an electrical signal wherein a unipolar electrical signal is delayed for a predetermined period of time and the difference between the input signal and the delayed signal is integrated to provide a continuous output. The system processes the signal through a voltage to frequency converter, a pulse counter, a complementer, an adder, a register and finally a digital-to-analog converter.

---

This invention provides a system for integrating an electrical signal, wherein an input electrical signal to the system is delayed for a predetermined period of time and the difference between the input signal and the delayed signal is integrated so as to provide a continuous output corresponding to the integral of the input signal for the delay time.

In various electric or electronic scientific equipments, many attempts have been made to increase the signal-to-noise ratio by integrating the signal including noise for a predetermined period of time. For example, when an electrical signal occurs periodically or electrical signals of the same waveform are repeatedly produced, a computer of average transient (to be referred to as CAT hereinafter) may advantageously be employed to separate the signal and noise components. As is well known, the CAT provides a predetermined number of sampling points within each one cycle of the signal to be measured, and during a predetermined number of signal cycles the signal values at the same sampling points are summed up, so that these sums are successively applied through a suitable holder for signal restoration so as to obtain a clear profile of the signal being measured. Such devices are commercially available under the tradenames of TAC (Model C–1024) manufactured by Varian Associates, California; COADDER (Model 300) by Block Engineering Inc., Cambridge, Massachusetts; ENHANCETRON (Model 1024) by Neuclear Data, Inc., Madison, Wisconsin; etc. They are all digital systems and comprise an analog-to-digital converter, digital memory elements, adders and a digital-to-analog converter. On the other hand, the signal educator manufactured by Princeton Applied Research Corp., Princeton, New Jersey, is of an analog type having the same function as the digital type and employs capacitors as memory elements, the number of which to be provided is determined by the number of sampling points provided.

Among many phenomena to be observed or measured, there are some, the occurence of which it is not desirable to have repeated. To put it in more concrete terms, in measurement of a signal repeatedly produced within a predetermined period of time, it sometimes is more preferable to make the signal scanning period longer, with less frequent repetition of the signal, rather than to make the scanning period shorter, with more frequent repitition of the signal. In spectrum analyzers such as spectrophotometers, for example, when the wavelength scanning has been finished in one direction, mechanical problems such as backlash in the scanning mechanism make it undesirable to perform the scanning in the opposite direction. In such a case, if the scanning is to be repeated many times, the period of time required for restoration of the scanning mechanism to its original condition must be wasted. It is not advisable, in such a case, to repeat the scanning or measurement of the signal.

Moreover, the signal-to-noise ratio resulting from the repeated measurement and integration of a signal within a predetermined period of time, with a shorter period of time for each scanning, differs little from the signal-to-noise ratio resulting from a single scanning and continuous integration of the signal within the same period of time.

Taking all these factors into consideration, there are cases where it is preferable to perform a single scanning of a signal within a given period of time, while continuously integrating the signal during the scanning, so as to provide a continuous output corresponding to the integrated signal.

Accordingly, the primary object of the invention is to provide a system for integrating an electrical signal, which is capable of providing a continuous output proportional to an integral of the input signal for a predetermined period of time.

Another object of the invention is to provide an analog system which is capable of integrating an input electrical signal to provide a continuous output corresponding to an integral of the input signal for a predetermined period of time.

A further object of the invention is to provide a digital system which is capable of integrating an input electrical signal to provide a continuous output signal corresponding to an integral of the input signal for a predetermined period of time.

In order to accomplish the above objects, the system of one embodiment of the invention is provided with means for delaying the input signal thereto for a predetermined period of time, means for subtracting the delayed signal from the input signal, and means for integrating the difference signal for the predetermined period of time, whereby a continuous output proportional to the input signal is produced. The input to the system is delayed for a predetermined period of time, and the delayed input signal is applied to a subtractor, to which the input signal is also directly applied, so that upon subtraction, the difference between the two signals is applied to an integrator or the like for integration. The integrated output of the system is continuous and not intermittent as in the case with conventional sampling systems.

The invention will be described in detail with reference to the accompanying drawings, wherein:

FIG. 1 is a graph illustrating the operation that the system of the invention is intended to accomplish;

FIG. 2 is a block diagram showing the general layout of the system of the invention;

FIG. 3 is a graphic illustration of the operation of the system of FIG. 2;

FIG. 4 is a circuit diagram showing an embodiment of the layout of FIG. 2 in an analog system;

FIG. 5 is a block diagram showing an embodiment of the layout of FIG. 2 in a digital system; and FIG. 6 is a graphic illustration of the operation of the digital system of FIG. 5.

Referring now to the drawings, FIG. 1 shows an input $S(t)$ to the system of the invention plotted against time $t$. The intended function of the system of the invention is to provide an output $$\int_{t_1-\tau}^{t_1} S(t)dt$$

at a given time $t_1$, an output $$\int_{t_2-\tau}^{t_2} S(t)dt$$

at another time $t_2$, and so forth. To put it in more general terms, the intended function of the system of the invention is such that for a given input $S(t)$ the system can continuously provide an output of $$\int_{T-\tau}^{T} S(t)dt$$

wherein T is a given time and $\tau$ is a time for integration. This can be accomplished by the arrangement of FIG. 2, wherein the reference numeral 10 denotes an input terminal of the system and the numeral 11, a junction, whence the input signal is applied to a subtractor 12 directly on the one hand and indirectly through a delay means 13 on the other. The delay means 13 delays the input signal for a predetermined period of time $\tau$. The subtractor 12 subtracts the delayed input from the directly applied input, and the resulting difference signal is applied to an integrator 14, the integrated output of which appears at a terminal 15, which is the output terminal of the system.

As previously mentioned, the intended function of the system of the invention is to provide at a given time T the output $$\int_{T-\tau}^{T} S(t)dt \quad (1)$$

If the input to the system of FIG. 2 is $S(t)$, its output will be expressed as follows:

$$\int_{0}^{T} \{S(t)-S(t-\tau)\}dt \quad (2)$$

Wherein T is a given time and $\tau$ is a delay time provided by the delay means 13. The integral (2) may be rewritten as follows:

$$\int_{0}^{T} S(t)dt - \int_{0}^{T} S(t-\tau)dt \quad (3)$$

If $t-\tau=t_3$, the latter integral in the Formula 3 will be $$\int_{-\tau}^{T-\tau} S(t_3)dt_3 \quad (4)$$

The function $S(t)$ here may generally be assumed to be zero when $t \leq 0$, just as those time functions which are Laplace-transformable. Then, the integral (4) will be equivalent to $$\int_{0}^{T-\tau} S(t)dt \quad (5)$$

Thus, we have the following equation:

$$\int_{0}^{T} \{S(t)-S(t-\tau)\}dt = \int_{0}^{T} S(t)dt$$

$$- \int_{0}^{T-\tau} S(t)dt = \int_{T-\tau}^{T} S(t)dt \quad (6)$$

The right-hand integral in the above Equation 5 is nothing but the integral (1), which is the intended function of the system. This says that the system of FIG. 2 can perform the intended function as shown in FIG. 1.

FIG. 3 graphically supports the above proof by mathematical expressions. In FIG. 3, there are plotted two curves $S(t)$ and $S(t-\tau)$ of the same shape but a little shifted from each other along the abscissa. The curve $S(t)$ expresses the input signal applied to the terminal 10, which is the direct input to the subtractor 12, while the other curve $S(t-\tau)$ expresses the input signal delayed by the delay means 13 for a period of time $\tau$, which is the other input to the subtractor 12. The output of the system of FIG. 2, at time T, as expressed by the integral (3)

$$\int_{0}^{T} S(t)dt - \int_{0}^{T} S(t-\tau)dt$$

is graphically expressed by the area A bounded by the group of points $a, b, c, d, e, f, g, h$ and $a$. On the other hand, as previously mentioned, the intended function of the system of the invention is to provide at time T an output as expressed by the integral (1)

$$\int_{T-\tau}^{T} S(t)dt$$

which is graphically expresesd by the area B bounded by the group of points $j$, T, $f, g, h, e$, and $j$. If the two areas A and B are equal, the system of FIG. 2 has the intended function. The two areas are equal if the hatched area A′ bounded by points $a, b, c, d, e, h$ and $a$ is equal to the other hatched area B′ bounded by points $e, j$, T, $f$ and $e$. A little close observation will tell that the two areas A′ and B′ are equal, since the two curves $S(t)$ and $S(t-\tau)$ are of the same shape and the distance between points $c$ and T is equal to that between points $b$ and $j$.

The general layout of the system of the invention shown in FIG. 2 may take the concrete form of an analog system as shown in FIG. 4 or a digital system as shown in FIG. 5. First in FIG. 4, the delay means 13 here takes the form of a magnetic tape recorder having a tape 16 adapted to be transferred from a pay-off reel 17 onto a take-up reel 18, and a recording or writing head 19 and a reading or reproducing head 20 facing the running tape 16, with a predetermined distance between the two heads. The input signal at the terminal 10 is applied through the junction 11 to the tape recorder on the one hand and to an inverter 21 on the other. The inverter comprises an operational amplifier 22 having an input resistor 23 and a feedback resistor 24, and produces an output signal the polarity of which is opposite to the polarity of its input signal. The inverted signal from the inverter 21 and the signal reproduced by the tape recorder head 20 are then applied to a Miller integrator 25 comprising an operational amplifier 26, a capacitor 27 connected thereacross and a pair of input resistors 28 and 29. The resistors 28 and 29 are connected to the output of the inverter 21 and the reproducing head 20 of the tape recorder, respectively, and form an adding or summing circuit.

The input signal applied to the terminal 10 is recorded, on the one hand, by the tape recorder head 19 on the tape 16 running in the direction X, and on the other applied to the inverter 21, where the polarity of the signal is inverted. The signal recorded on the tape 16 is read by the other head 20 after a time delay $\tau$ determined by the distance between the two heads 19 and 20 and the running speed of the tape 16. Thus, the inverted signal from the inverter 21 and the delayed signal from the tape recorder 13 are applied to the Miller integrator 25 with the input summing circuit, where the two signals are summed up and the sum (or difference in reality due to the opposite polarities of the two signals) is integrated continuously. The integrated signal can be taken out at the output terminal 15 of the system. It will be easily seen that the subtractor 12 in FIG. 2 takes the form of the inverter 21 and the summing circuit composed of the input resistors 28 and 29 of the Miller integrator in FIG. 4.

FIG. 5 shows another embodiment of the invention in a digital system. The signal voltage at the input terminal 10 is applied to a voltage-to-frequency converter 30, which produces a pulse train in response to unipolar input signals having a pulse rate proportional to the input voltage level. The pulses are applied to a pulse counter 31. The counter is reset by a timing pulse applied thereto at a predetermined interval $\Delta T$ via a clock pulse generator 32, so that during each time interval $\Delta T$, the counter 31 counts the pulses from the converter 30 and, upon reception of a timing pulse, produces an output signal corresponding to the counted value, which is proportional to the integral of the input voltage for the time period $\Delta T$. The output of the counter 31 is applied through a junction 11 to a buffer register 33 on the one hand and to one input of an adder 34 on the other. The buffer register comprises a plurality of one-word registers 33–1, 33–2, . . . 33–$n$, each so designed as to transfer its stored information onto the next (righthand) one every time it receives a timing pulse via the pulse generator 32. The output of the buffer register 33 is applied through a complementer 35 to a second input of the adder 34. The output of the adder 34 is applied to a register 36, the output of which is applied back to a third input of the adder 34. The adder summs up the three inputs and applies the sum to the register 36, the output of which is applied back to the adder and a digital-to-analog converter 37 at the same time. The output of the converter 37 is taken out at a terminal 15 as an analog voltage proportional to the integral of the input voltage at the terminal 10 for a predetermined period of time.

As previously mentioned, between time $T=0$ and time $T=\Delta T$, that is, during the time interval $\Delta T$ defined by two succeeding timing pulses applied from the pulse generator 32, the counter 31 counts a certain number of pulses from the converter 30. The counted number is a digital quantity proportional to the integral of the input voltage at the terminal 10 during the time period $\Delta T$.

When the counter receives a timing pulse from the pulse generator 32 at time $T=\Delta T$, it produces an output expressing the digital quantity to be applied to the first one-word register 33–1 in the buffer register 33 and to the second input of the adder 34 at the same time. Immediately thereafter, the counter 31 is reset by a reset signal obtained on the basis of the timing pulse, so that it will count the succeeding pulses from the converter 31 until the next timing pulse has been received at time $T=2\Delta T$, whereupon the information stored in the first one-word register 33–1 is transferred onto the next one 33–2 to the right. At the same time the output of the counter expressing the digital quantity proportional to the integral of the input voltage at the terminal 10 from $T=\Delta T$ to $T=2\Delta T$ is applied to the first one-word register 33–1 to be stored therein. Thus, upon passage of time $n\Delta T=\tau$, that is, when $n$ timing pulses each followed by a time interval $\Delta T$ have been applied from the pulse generator 32, the first output of the counter at time $T=\Delta T$ has been transferred onto the last one-word register 33–$n$ to be stored therein.

As previously mentioned, each output of the counter 31 is also applied to the adder 34, the output of which is applied to the register 36 At time $T=\Delta T$, the output from the counter 31, that is, NT1 is applied to the adder and thence to the register 36 to be stored therein. Then at time $T=2\Delta T$, the output from the counter 31 (which equals NT2) is applied to the adder, where NT2 and the output from the register applied back to the adder, i.e., NT1, are added and the sum $$\left(\sum_{k=2}^{1} N_{T_k}\right)$$

is applied to be stored therein and applied back to the adder. Thus, at time $T=n\Delta T$ the stored contents of the register 36 become $$\sum_{k=n}^{1} T_k$$

which is applied back to the adder. Until this time, no output is produced by the buffer register 33, and at time $T=(n+1)\Delta T$ the register 33 produces an output NT1 (which is the first or earlies produced by the counter 31). This output is applied through the complementer to be applied to the adder as $-NT1$. On the other hand, the counter 31 applies $N_{T_{n+1}}$ to the adder 34, wherein $$\sum_{k=n}^{1} N_{T_k}$$

$N_{T_{n+1}}$ and $-NT1$ are added, and the result $$\sum_{k=n+1}^{2} N_{T_k}$$

is stored in the register 36. It will be easily seen that at time $(n+2)\Delta T$ the stored contents of the register 36 are $$\sum_{k=n+2}^{3} N_{T_k}$$

To put the above in more general terms with reference to FIG. 5 and 6, at time $T_i$ when a timing pulse $P_{T_i}$ has been applied from the pulse generator 32, the output of the counter 31 represents a digital quantity $N_{T_i}$ proportional to the integral of the input voltage at the terminal 10 from time $T_{i-1}$ to $T_i$, and this output signal appears at the input lines of the buffer register 33 and the adder 34 at the same time. Immediately before the application of the timing pulse $P_{T_i}$, the informations stored in the one-word registers 33–1, 33–2, . . . 33–($n$–1) and 33–$n$ are the digital quantities $N_{T_{i-1}}$, $N_{T_{i-2}}$, . . . $N_{T_{i-n+1}}$ and $N_{T_{i-n}}$ proportional to the integrals of the input voltage at the terminal 10 from time $T_{i-2}$ to $T_{i-1}$, from $T_{i-3}$ to $T_{i-2}$, . . . from $T_{i-n}$ to $T_{i+1}$ and from $T_{i-n-1}$ to $T_{i-n}$, respectively. In FIG. 5, the stored contents of the one-word registers 33–1, . . . 33–$n$ are labeled as the contents just immediately before the application of the timing pulse $P_{T_i}$. When the timing pulse $P_{T_i}$ has been applied, a signal expressing the quantity $N_{T_{i-n}}$ stored in the last one-word register 33–$n$ appears at the second input line of the adder 34 as $-N_{T_{i-n}}$ due to the complementer 37 (FIG. 5). At this time the register 36 already has the then output $$\sum_{k=i-n}^{i-1} N_{T_k}$$

from the adder 34 already stored therein which is applied to the converter 37 on the one hand and on the other through the third input line back to the adder, to which are applied also the other two inputs $N_{T_i}$ and $-N_{T_{i-n}}$. Then, the adder 34 sums up the three inputs $N_{T_i}$, $-N_{T_{i-n}}$, and $$\sum_{k=i-n}^{i-1} N_{T_k}$$

and the resulting sum $$\sum_{k=i-n+1}^{i}$$

is stored in the accumulator 36. This stored information is applied to the digital-to-analog converter 37 on the one hand, and back to the adder 34 on the other to be ready to be combined with the next inputs $N_{T_{i+1}}$ and $-N_{T_{i-n+1}}$ from the pulse counter 31 and the complementer 35, respectively, upon application of the next timing pulse $P_{T_{i+1}}$ from the pulse generator 32.

The input signal $$\sum_{k=i-n+1}^{i}$$

$N_{T_k}$ to the converter 37 is converted to a corresponding analog voltage, which can be taken out at the output terminal 15 of the system. It will be easily seen from FIG. 4 that the quantity $$\sum_{k=i-n+1}^{i}$$

$N_{T_k}$ is equal to the integral $$\int_{T_i-T_{i-n}}^{T_i} S(t)dt$$

It will also be easily seen that the buffer register in FIG. 4 corresponds to the delay means 13 in FIG. 2 and the complementer 35, the adder 34 and the register 36, to the subtractor 12 and the integrator 14.

Having illustrated and described preferred embodiments of the invention, it is understood that there may be modifications and changes thereof, within the scope of the invention as defined in the appended claims.

What I claim is:

1. A system for integrating a unidirectional electrical signal for a predetermined period of time to provide a continuous output, comprising: a first means for successively producing a digital quantity corresponding to an analog input signal to the system; said first means comprising a voltage-to-frequency converter and a pulse counter connected to the output of said converter for counting the pulses produced thereby; and a clock pulse generator for providing a clock pulse at a predetermined interval to be applied to said counter to cause the same to successively produce an output expressing the digital quantity corresponding to the pulses that have been counted and reset said counter, second means for storing said successive digital quantities produced for a predetermined period of time ($\tau$); third means for successively subtracting from said stored digital quantities the digital quantity that was earliest produced, upon every successive addition of a digital quantity to said stored digital quantities; said third means comprising a buffer register connected in controlled relation to said clock pulse generator and having its input connected to the output of said pulse counter for storing, upon successive reception of said clock pulses, the successive outputs therefrom for a predetermined period of time and successively producing an output corresponding to the successive earliest stored one of said stored signals, a complementer connected to the output of said buffer register, and an adder having its input connected to the outputs of both said pulse counter and said complementer, the output of said adder being connected to the input of said second means, the output of which is connected back to the input of said adder; and fourth means receiving the result of said subtraction and addition to produce an analog output corresponding to said result.

References Cited
UNITED STATES PATENTS

| | | | |
|---|---|---|---|
| 2,566,189 | 8/1951 | Gloess | 343—7.7 |
| 2,836,359 | 5/1958 | Mazzagatti | 235—183 |
| 3,112,397 | 11/1963 | Crook | 235—183 |
| 3,134,101 | 5/1964 | Dickey | 343—7.7 |
| 3,303,335 | 2/1967 | Pryor | 235—181 |
| 3,333,090 | 7/1967 | Neer | 235—183 X |

MALCOLM A. MORRISON, Primary Examiner

F. D. GRUBER, Assistant Examiner

U.S. Cl. X.R.

235—150.51, 156, 165